US012644960B2

(12) United States Patent
Petre et al.

(10) Patent No.: US 12,644,960 B2
(45) Date of Patent: Jun. 2, 2026

(54) SYSTEMS, METHODS, AND APPARATUS FOR DENOISING SIGNALS

(71) Applicant: The Boeing Company, Arlington, VA (US)

(72) Inventors: Peter Petre, Arlington, VA (US); Peter S. Wittenberg, Arlington, VA (US); Andrew D. Smith, Arlington, VA (US)

(73) Assignee: The Boeing Company, Arlington, VA (US)

( * ) Notice: Subject to any disclaimer, the term of this patent is extended or adjusted under 35 U.S.C. 154(b) by 483 days.

(21) Appl. No.: 18/309,513

(22) Filed: Apr. 28, 2023

(65) Prior Publication Data

US 2024/0361426 A1 Oct. 31, 2024

(51) Int. Cl.
| | |
|---|---|
| *H04L 1/06* | (2006.01) |
| *G01S 7/28* | (2006.01) |
| *G01S 7/41* | (2006.01) |
| *G01S 7/52* | (2006.01) |

(52) U.S. Cl.
CPC .............. *G01S 7/2813* (2013.01); *G01S 7/41* (2013.01); *G01S 7/52077* (2013.01)

(58) Field of Classification Search
CPC ..... G10L 15/30; G10L 15/005; G10L 21/028; G10L 25/84; G06F 7/582; G01S 7/38; H04R 25/405; G10K 11/34; H04B 1/18; H04B 1/1027; H04B 2001/1063
See application file for complete search history.

(56) References Cited

U.S. PATENT DOCUMENTS

| | | | |
|---|---|---|---|
| 10,128,820 B2 | 11/2018 | Petre et al. | |
| 10,380,062 B1 | 8/2019 | Rao et al. | |
| 10,783,430 B2 | 9/2020 | Wittenberg et al. | |
| 10,921,422 B2 | 2/2021 | Smith et al. | |
| 11,165,414 B2 | 11/2021 | Popescu-Stroe et al. | |
| 2020/0343919 A1* | 10/2020 | Shaw ..................... | H04B 15/00 |

* cited by examiner

*Primary Examiner* — Phuoc H Doan
(74) *Attorney, Agent, or Firm* — Harrity & Harrity, LLP

(57) ABSTRACT

Systems, methods, and apparatus for denoising signals are disclosed. In one aspect, an apparatus is provided. The apparatus may comprise a first denoiser configured to receive an input signal and to generate a denoised signal and a signal reverser configured to receive the input signal and to generate a time reversed signal. The apparatus may also include a second denoiser configured to receive the time reversed signal and to generate a denoised time reversed signal. Further, the apparatus may include a signal combiner configured to combine the denoised signal with the denoised time reversed signal to generate an output signal.

20 Claims, 6 Drawing Sheets

Noisy Signal

Forward Learning

Reverse Learning

SYSTEMS, METHODS, AND APPARATUS FOR DENOISING SIGNALS

FIELD

The present disclosure relates to signal processing, and more particularly, to denoising signals.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Wireless communications technologies continue to advance rapidly, enabling increasingly larger transmission and reception bandwidth. In communication systems, a receiver system may receive and process energy waves to identify desired information carried in the energy waves. As used herein, an "energy wave" is a disturbance that propagates through at least one medium while carrying energy. For example, energy waves may comprise electromagnetic waves, radio waves, microwaves, sound waves or ultrasound waves.

The receiver system typically includes a transducer and a receiver. The transducer may convert one type of energy into another type of energy. The transducers used in a receiver system are typically configured to receive energy waves (e.g., source signals) and convert these energy waves into an electrical signal. An antenna is one example of a transducer. The receiver system processes the electrical signal generated by the transducer to obtain desired information from the electrical signal. The desired information may include information about the signals carried in the energy waves.

The receiver system may generate an output signal that typically includes noise. The noise may significantly impact the ability of the receiver system to convey low amplitude signals. In order to enhance the quality of the output signal of the receiver system (e.g., maximize the signal-to-noise ratio), conventional filter-based components or techniques are typically used to denoise the output signal (e.g., eliminate or reduce the noise). For example, the filter-based components may receive the output signal from the receiver system and output or generate a denoised signal. However, the filter-based components may have a transient or settling period (e.g., rise time) before the denoised or output signal reaches and maintains a steady state or settles within a specified percentage of a desired final value. Similarly, when the output signal of the receiver system is no longer received by the filter-based components, the filter-based components may have a transient or settling period (e.g., fall time) before the denoised signal reaches a steady state or a desired final value. The response times (e.g., rise and fall times) of the conventional filter-based components or techniques may vary depending on the filter order and time constant.

Communication systems typically process and use the steady state portions of the denoised signal from the filter-based components and discard the data and/or portions of the denoised signal during the transient or settling periods. Discarding the data of the denoised signal may be acceptable when the data discarded is small as compared to the length of the denoised signal. However, some applications may only analyze signals with a small number of samples and discarding data may not be practical or ideal. Further, in some applications (e.g., narrow bandwidth filters), long or complex filers may be required to denoise the output signals of the receiver system, resulting in long transient or settling times. Long settling times, however, may be a serious disadvantage in some applications. For example, long settling times may be undesirable due to system performance which may require operating an electronic device at high speeds. Additionally, the settling time can negatively affect the dynamic performance of the filter. For example, it may take longer for the output of the filter to level out (e.g., converge) to a stationary value in response to a change in its input signal. Therefore, there is a need for a denoiser that can generate accurate denoised signals during transient response periods of the denoiser.

SUMMARY

The present application is directed to embodiments that relate to systems, methods, and apparatus for processing signals, such as wireless communications, received from one or more sources in an environment. The embodiments may be configured to denoise the received signals to achieve high signal-to-noise ratios (SNR). The embodiments may denoise the received signals in real-time and may perform the denoising operations using one or more antennas. The embodiments may reduce or eliminate delays due to transient or settling periods for the denoised signal to reach a steady state. For example, the embodiments may combine a transient period of the denoised signal with a reversed transient portion of the denoised signal to generate an accurate denoised signal. As a result, the transient portions of the denoised signal may not need to be discarded. The features of the embodiments may provide many benefits for applications such as communication, automotive anti-collision radars, and electronic warfare.

In one aspect, an apparatus is provided. The apparatus may comprise a first denoiser configured to receive an input signal and to generate a denoised signal, and a signal reverser configured to receive the input signal and to generate a time reversed signal. The apparatus may also include a second denoiser configured to receive the time reversed signal and to generate a denoised time reversed signal. Further, the apparatus may include a signal combiner configured to combine the denoised signal with the denoised time reversed signal to generate an output signal.

In another aspect, a method is provided. The method may include denoising an input signal to generate a denoised signal and performing a time-reversal operation on the input signal to generate a time reversed signal of the input signal. The method may also include denoising the time reversed signal to generate a denoised time reversed signal and generating an output signal based on the denoised signal and the denoised time revered signal.

In a further aspect, a non-transitory computer-readable medium storing instructions is disclosed that, when the instructions are executed by one or more processors, causes the one or more processors to perform operations. The operations may include denoising an input signal to generate a denoised signal and generating a time reversed signal of the input signal. The operations may also include denoising the time reversed signal to generate a denoised time reversed signal. Further, the operations may include generating an output signal by combining the denoised signal with the denoised time revered signal.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more complete understanding of embodiments of the present application may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
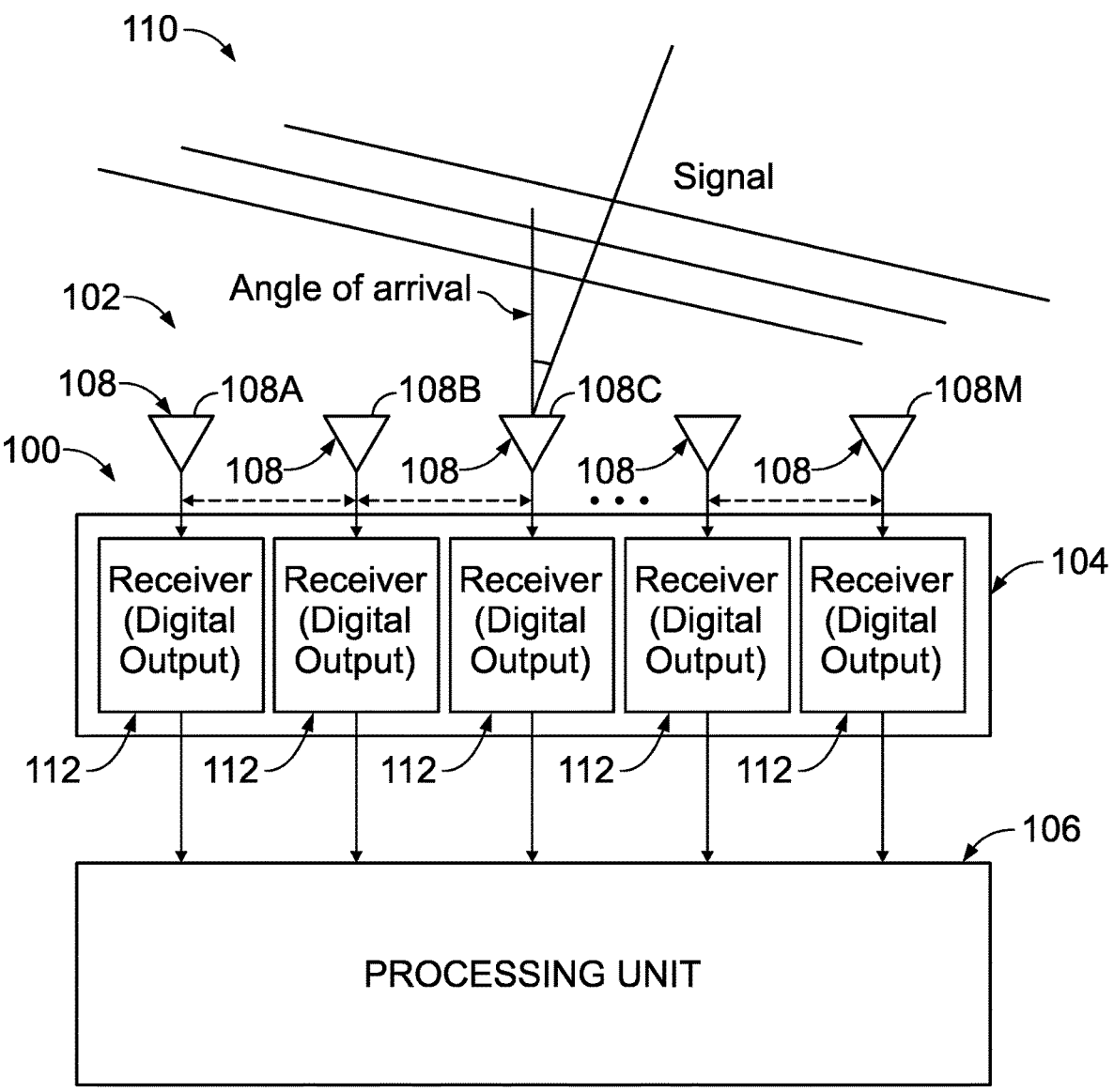
FIG. 1 is a simplified block diagram illustrating a system for processing signals, according to an example embodiment.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature may be used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, sensors are illustrated and associated with reference number 108. When referring to a particular one of the sensors, such as the sensor 108A, the distinguishing letter "A" may be used. However, when referring to any arbitrary one of the sensors or to the sensors as a group, the reference number 108 may be used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

The present application is directed to embodiments that relate to systems, methods, and apparatus for processing signals, such as wireless communications, received from one or more sources in an environment. The embodiments may be configured to denoise the received signals to achieve high signal-to-noise ratios (SNR). The embodiments may denoise the received signals in real-time and may perform the denoising operations using one or more antennas. The embodiments may reduce or eliminate delays due to transient or settling periods of the denoised signal prior to reaching a steady state. For example, the embodiments may combine a transient period of the denoised signal with a reversed transient portion of the denoised signal to generate an accurate denoised signal. As a result, the transient portions of the denoised signal may not need to be discarded. The features of the embodiments may provide many benefits for applications such as communication, automotive anti-collision radars, and electronic warfare.

Referring now to the drawings, and more particularly to FIG. 1, a block diagram of a system 100 is illustrated for processing signals, in accordance with an exemplary implementation. In one embodiment, the system 100 may be configured to receive and process signals (e.g., wireless signals) emitted from one or more sources in an environment. The signals may represent electromagnetic energy or waves of any type that may be received by the system 100. For example, the signals may include radar and/or radio frequency (RF) signals. In some embodiments, the signal may include far field plane waves. The system 100 may be configured to denoise the received signals to achieve high signal-to-noise ratios (SNR).

As shown in FIG. 1, the system 100 includes a sensor array 102, a receiver unit 104, and a computing device or processing unit 106. The sensor array 102 may be communicatively coupled to the receiver unit 104 and may be configured to receive or detect electromagnetic signals from one or more sources. The sensor array 102 may include M sensors 108. The M sensors 108 may be configured to transmit and/or receive signals. In some embodiments, the sensor array 102 may include an antenna array having multiple antennas. The sensor array 102 may have any suitable configuration or geometry. For example, the sensor array 102 may have any suitable number of sensors which can be positioned in any desirable pattern/orientation to obtain a particular field of view, sensitivity, etc. For example, the M sensors 108 of the sensor array 102 may be uniformly or non-uniformly spaced, arranged linearly or non-linearly (e.g., curved), and so forth. The sensor array 102 may be a 1-dimensional (1D) array, a 2-dimensional (2D) array, or a 3-dimensional (3D) array.

The M sensors 108 of the sensor array 102 may be configured to sample the electromagnetic field and to generate an electrical signal in response to an incident electromagnetic signal. For example, each of the M sensors 108 of the sensor array 102 may receive signals 110 and provide output signals (e.g., a channel) corresponding to the signals received by the M sensors 108. The signal 110 may arrive at each sensor 108A-108M at slightly different times, which causes the phase of the signals 110 received at the M sensors 108 of the sensor array 102 to be different and to arrive at different times. The signals 110 may arrive at an angle θ relative to the M sensors 108 of the sensor array 102. The signals 110 received by the M sensors 108 may include signals derived from different sources or transmitters. For example, the signals may include a combination or mixture of signals from one or more sources. The signals received by the M sensors 108 of the sensor array 102 may also include background or environmental noise (e.g., a noise signal).

Each sensor 108A-108M of the sensor array 102 may be configured to receive a signal and provide a separate data stream or channel. The M sensors 108 may be configured to take N time samples of the signal at time points $t_i$, $i=1, \ldots, N$. The M sensors 108 may be configured to be sampled at the same time as each other. For example, each sensor may be sampled simultaneously at a time index t to produce an output signal. The output signals of the sensor array 102 may include signal or data elements $x_1$, $x_2$, $x_3, \ldots, x_M$ representing the output signal from each of the individual sensors. The output signals of the sensor array 102 for N sampling times may be denoised as further described below.

Referring still to FIG. 1, the receiver unit 104 of the system 100 may be configured to receive the output signals generated by each of the M sensors 108 of the sensor array 102 and process the output signals. As shown in FIG. 1, the receiver unit 104 may be communicatively connected to each of the M sensors 108 of the sensor array 102. The receiver unit 104 may include M receivers 112 (e.g., M receiver circuits). Each of the M receivers 112 may be coupled to a respective sensor of the sensor array 102 and may receive, as an input, the output signals or channel generated by the respective sensor.

The M receivers 112 of the receiver unit 104 may each include to an analog-to-digital (A/D) converter (not shown) operatively coupled or connected to a respective sensor of the sensor array 102. In some embodiments, each of the M receivers 112 may be operatively coupled or connected to a respective ADC by an amplifier and/or other components. Each of the M receivers 112 of the receiver unit 104 may be configured to downconvert the frequency of the output signals received from a respective sensor and to demodulate the converted signal to a signal comprising an orthogonal I signal and a Q signal. Each of the M receivers 112 may be configured to sample the respective I signals and Q signals of the demodulated signal and convert the demodulated signals to a digital signal (e.g., a complex baseband IQ signal). The digital signal may have the I signal as the real part and the Q signal as the imaginary part. The digital signal may each include the signal or data elements $x_1$, $x_2$, $x_3, \ldots, x_N$ for each of the M receivers 112 at each time t. The receiver unit 104 may output the data elements for each time sample to the processing unit 106 for denoising as further described below.

The processing unit 106 of the system 100 may receive the digital signals (e.g., complex baseband IQ signals) from the receiver unit 104 and process the digital signals. The processing unit 106 may be configured to denoise the digital signals. In some embodiments, the processing unit 106 may include a multiple input denoiser or module configured to de-noise the digital signals. In some embodiments, the processing unit 106 may be incorporated in or may be part of the receiver unit 104. Further, the processing unit 106 may generate data, which may be utilized to generate signals to be transmitted by the sensors. For example, the processing unit 106 may determine coefficient data that may be utilized for precoding and/or beamforming for transmission signals.

The processing unit 106 of the system 100 may be configured to receive the data elements of the digital signals (e.g., complex baseband IQ signals) for N time samples from each of the M sensors 108 of the sensor array 102. The number of time samples N may be greater than the number of the M sensors. For example, N samples may be several hundred to several thousand samples. The processing unit 106 may be configured to generate a data vector based on the digital elements received from each of the M sensors 108 at a sampling time t. The data vector may define the magnitude and phase of the signals received at the M sensors 108 of the sensor array 102 from a source or transmitter.

The processing unit 106 of the system 100 may denoise the digital signals received from the receiver unit 104. For example, the processing unit 106 may be configured to separate or distinguish the received signals from noise and to generate denoised signals. In some embodiments, the processing unit 106 may use the denoised signals to determine the time difference between the arrival of the signals received by the M receivers 112 or antennas of the M receivers 112. Further, in some embodiments, the processing unit 106 may be configured to use the denoised signals to estimate the angle of arrival (AOA) of the received signals and to generate an output including the estimated angle of arrival information, which may, for example, be communicated to a vehicle communication system (e.g., an aircraft's avionics unit) for determining a location of an emitting source relative to the vehicle (e.g., aircraft). The denoised signal may also be used for anomaly detection, blind source separation, signal classification, event/behavior prediction, and autonomous action generation. As such, the features of the system 100 may provide many benefits for applications such as communication, automotive anti-collision radars, and electronic warfare.

Figure 2:
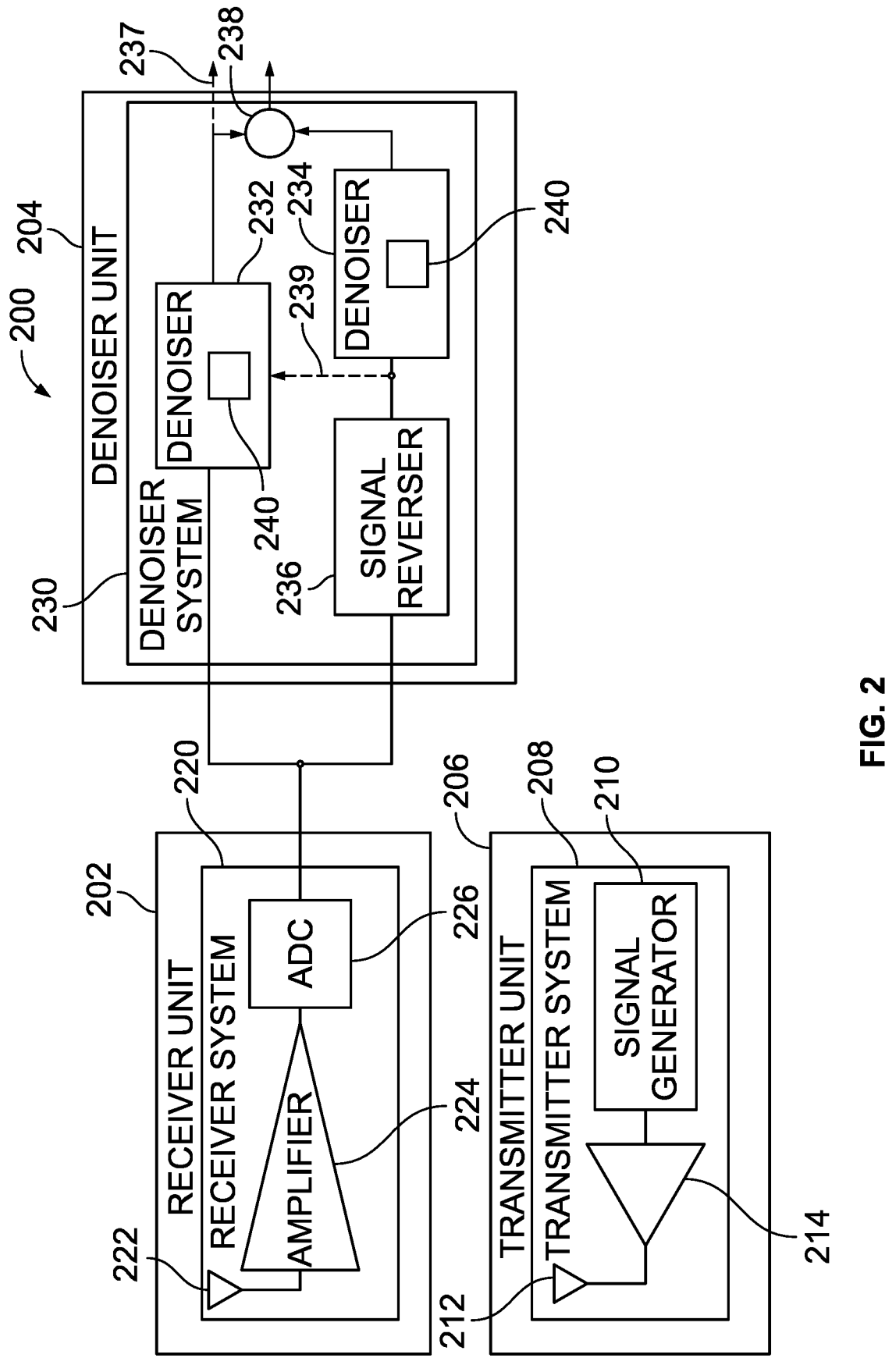
FIG. 2 is a simplified block diagram illustrating another system for processing signals, according to an example embodiment.

FIG. 2 is a block diagram of another example of a system 200 for denoising signals in accordance with an exemplary embodiment. The system 200 may be configured to receive and process signals (e.g., wireless signals) received from one or more sources in an environment. The signals may represent electromagnetic energy or waves of any type that may be received by the system 200. For example, the signals may include radar and/or radio frequency (RF) signals. The system 200 may be configured to denoise the received signals to achieve high signal-to-noise ratios (SNR).

As shown in FIG. 2, the system 200 may include a receiver unit 202 and a denoiser unit 204. The receiver unit 202 may be operatively coupled or connected to the denoiser unit 204. In some embodiments, the system 200 may include a transmitter unit 206 for transmitting a radio frequency (RF) signal or a radar signal. The transmitter unit 206 may include one or more transmitter systems 208 (one being shown). The transmitter system 208 may include a signal generator 210 and a transmit antenna 212. The signal generator 210 may be operatively coupled or connected to the transmit antenna 212 by a transmit amplifier 214 and/or other components. In accordance with an example, the transmitter system 208 transmits a continuous wave signal. In other embodiments, signals with other types of waveforms may be transmitted. The transmitter system 208 may include different components or arrangement of components in other embodiments. In some embodiments, one or more of the components of the system 200 may be provided on a single chip.

The receiver unit 202 of the system 200 may include one or more receiver systems 220 (one being shown). The receiver systems of the receiver unit 202 may be separated by a predetermined distance. As shown in FIG. 2, the receiver system 220 includes an antenna 222, an amplifier 224, and an analog to digital converter (ADC) 226. The antenna 222 of the receiver system 220 may receive one or more radio frequency (RF) source signals from one or more RF signal sources. The antenna 222 may simultaneously receive the RF source signals (or portions of the RF source signals) and combine the signals to form a mixture signal or mixture signals over time. Portions of the RF source signals received by the antenna 222 may partially overlap in time. The mixture signal may include background noise and/or environmental noise. In some embodiments, the receiver system 220 may be configured to receive radar signals reflected from one or more objects in the environment. The reflected signals may also include background noise and/or environmental noise.

The amplifier 224 of the receiver system 220 may be operatively coupled or connected to the antenna 222 and the analog-to-digital converter (ADC) 226. The amplifier 224 may be configured to receive the mixture signal from the antenna 222. The amplifier 224 may amplify the mixture signal and may add receiver noise to the mixture signal. For example, the amplifier 224 may amplify the mixture signal to a level that the amplitude of the mixture signal is sufficient for sampling the mixture signal by the ADC 226. Accordingly, the amplifier 224 amplifies the mixture signal to a predetermined level or amplitude that permits the ADC 226 to effectively sample or digitize the mixture signal. The mixture signal may need to be amplified because some of the source signals or a source signal of interest may have a significantly smaller amplitude than other source signals that form the mixture signal. The amplification of the mixture signal also amplifies the source signal of interest within the mixture signal so that another higher amplitude source signal or signals can be extracted and removed from the mixture signal (or from a digital representation of the mixture signal). As such, the source signal of interest may be further analyzed or used for further processing.

Figures 3A, 3B, 3C:
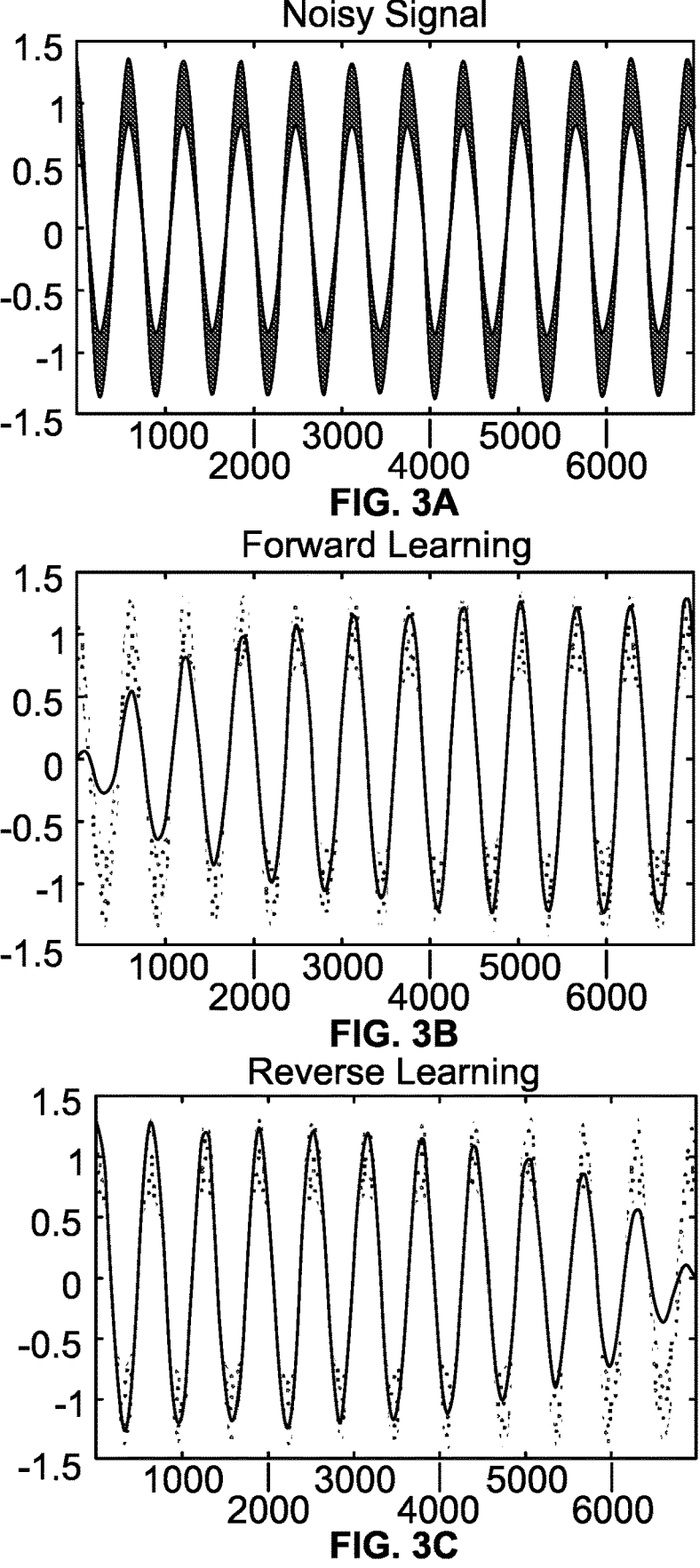
FIG. 3A depicts an exemplary waveform of signal output by a receiver.
FIG. 3B depicts an exemplary waveform of a denoised signal during a transient period.
FIG. 3C depicts an exemplary waveform of a time reversed signal of the denoised signal of FIG. 3B.

The ADC 226 of the receiver system 220 may be operatively coupled or connected to the amplifier 224 and the denoiser unit 204. The ADC 226 may be configured to sample or digitize the mixture signal received from the amplifier 224 and to generate a digitized or sampled signal. The digitized signal may include receiver noise and/or other noise. The digitized signal may be characterized as a time-series of data points that are samples from one or more signals o of the mixture signal. The ADC 226 may output the digital signal to the denoiser unit 204 that is configured to denoise the digital signal. FIG. 3A show an exemplary waveform of the digital signal to be denoised by the denoiser unit 204.

The denoiser unit 204 of the system 200 may include one or more denoiser systems 230 (one being shown). As shown in FIG. 2, the denoiser system 230 includes a first denoiser 232, a second denoiser 234, a signal reverser 236, and a signal combiner 238 (e.g., signal mixer). In some embodiments, the denoiser system 230 may have a single denoiser system instead of the first and second denoisers 232 and 234. The first denoiser 232 of the denoiser unit 204 may be operatively coupled or connected to the ADC 226 of the receiver system 220 and the signal combiner 238. The first denoiser 232 may be configured to receive the digital signal from the ADC 226 of the receiver system 220 and to denoise the digital signal as further described below. The denoised signal may be characterized as a time-series of data points. The first denoiser 232 may output the denoised signal and send the denoised signal to the signal combiner 238.

The first denoiser 232 of the denoiser system 230 may have a "learning or transient period" (e.g., rise time) that is necessary for the output (e.g., the denoised signal) to reach and maintain a stable or accurate denoised or output signal. For example, after receiving a change of the digital signal from the receiver system 220, the output (e.g., the denoised signal) of the first denoiser 232 may not reach or settle within a specified percentage or range of a desired final value for a period of time. As such, the denoised signal may be not be stable unit during the transient period and before the denoised signal reaches a steady state. FIG. 3B shows an exemplary waveform (e.g., denoised signal) generated or output, during the learning or transient, period by the first denoiser 232 in response to the digital signal from the receiver system 220. The response time of the first denoiser 232 may be referred to as a forward learning period. In some embodiments, the output of the first denoiser 232 may be used, after the transient period, as the output of the denoiser unit 204 as shown by line 237. A selector or multiplexer (not shown) may be used to select the output of the first denoiser 232 or the output of the signal combiner 238 as the output of the denoiser unit 204.

As shown in FIG. 2, the signal reverser 236 of the denoiser system 230 may be operatively coupled or connected to the ADC 226 of the receiver system 220 and the second denoiser 234. The signal reverser 236 may be configured to receive the digital signal from the ADC 226 of the receiver system 220 and to time reverse the digital signal. The time reversed signal can be generated by reversing the digital signal with respect to time. For example, the time reversed signal may be time reversed from the digital signal received from the ADC 226. The signal reverser 236 may output the time reversed signal and send the time reversed signal to the second denoiser 234. When a single denoiser system is used instead of the first and second denoisers 232 and 234, the time reversed signal and the output of the receiver system 220 may be input into the single denoiser system as shown by line 239. A selector or multiplexer (not shown) may be used to select the signal to be input into the first denoiser 232.

The second denoiser 234 of the denoiser system 230 may be operatively coupled or connected to the signal reverser 236 and the signal combiner 238. The second denoiser 234 may be configured to receive the time reversed signal from the signal reverser 236 and to denoise the time reversed signal as further described below. The denoised signal may be characterized as a time-series of data points. The second denoiser 234 may output the denoised time reversed signal and send the denoised time revered signal to the signal combiner 238.

The second denoiser 234 may have a "learning or transient period" (e.g., rise time) that is necessary for the output (e.g., the denoised signal) to reach and maintain a stable or accurate denoised or output signal. For example, after receiving a change of the time reversed signal from the signal reverser 236, the output (e.g., the denoised signal) of the second denoiser 234 may not reach or settle within a specified percentage or range of a desired final value for a period of time. As such, the denoised time reversed signal may not be stable during the transient period and before the denoised time reversed signal reaches a steady state. FIG. 3C shows an exemplary waveform (e.g., denoised signal) generated or output, during the learning or transient period, by the second denoiser 234 in response to the time reversed signal from the signal reverser 236. The response time of the second denoiser 234 may be referred to as a reverse learning period.

Figure 4:
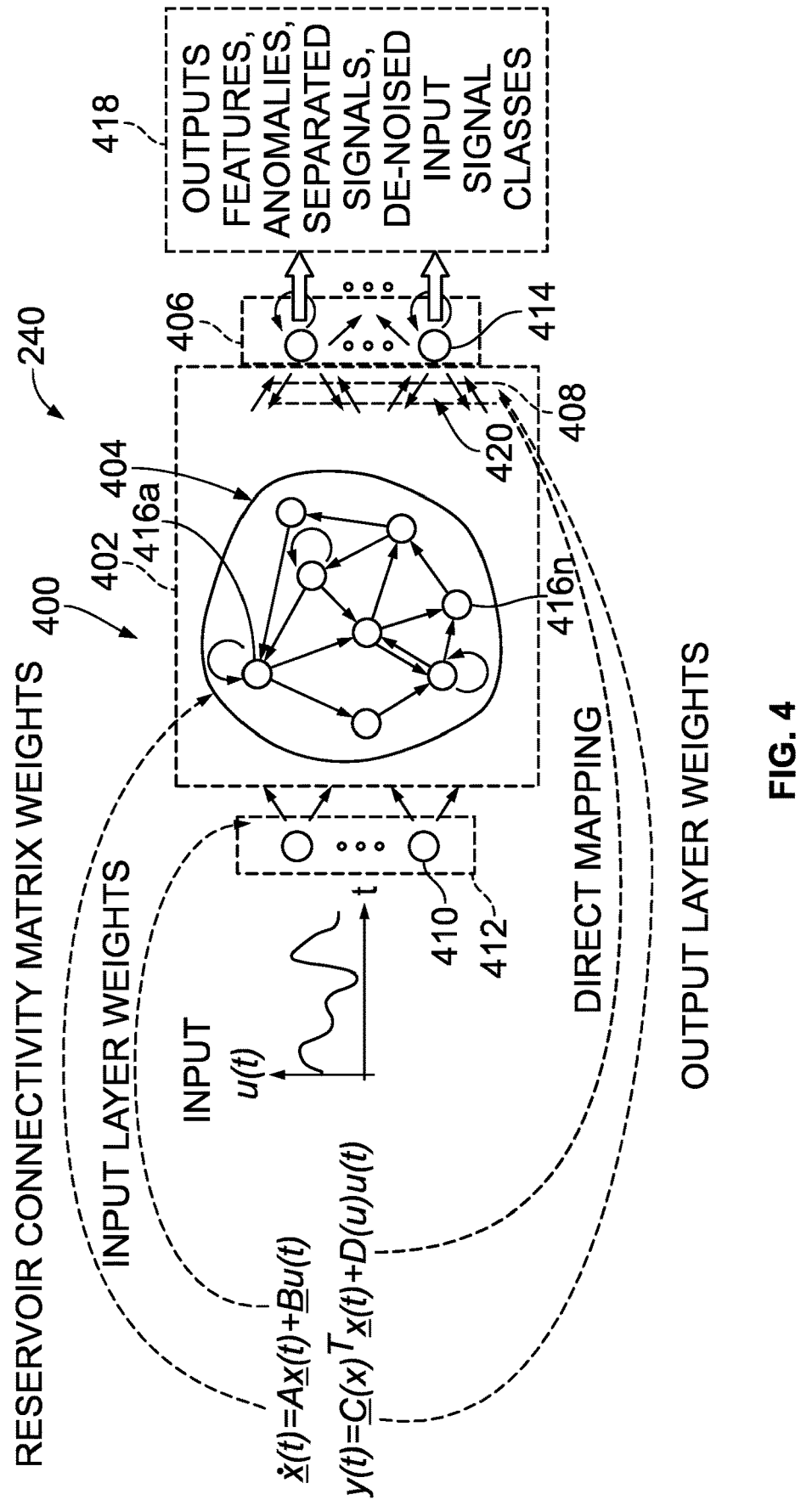
FIG. 4 is a simplified diagram of an example of a neural network reservoir of a denoiser, according to an example embodiment.

As shown in FIG. 2, the first and second denoisers 232 and 234 of the denoiser system 230 each includes a neural network reservoir 240 for detecting and denoising the digital signals received from the receiver system 220 or the receiver unit 202. FIG. 4 shows an example block diagram of the neural network reservoir 240 of each of the first and second denoisers 232 and 234 in accordance with an exemplary embodiment. In some embodiments, the neural network reservoir 240 may be embodied in a reservoir computing device or cognitive processor. An example of a reservoir computing device or cognitive processor that may be used for the neural network reservoir 240 is described in U.S. Pat. No. 10,921,422, which is assigned to one of the same assignees as the present application and which is incorporated herein by reference.

The neural network reservoir 240 includes a cognitive signal denoising architecture 400 that is based on a form of neuromorphic (brain-inspired) signal processing known as reservoir computing. Reservoir computing is a special form of a recurrent neural network 402 (a neural network with feedback connections) that operates by projecting the input signal vector or input signal into a high-dimensional or multi-dimensional reservoir state-space representation 404 which contains an equivalent dynamical model of the signal generation process capturing all of the available and actionable information about the input signal. The neural network reservoir 240 or reservoir computer has readout layers 406 that can be trained, either off-line or on-line, to learn desired outputs by utilizing state functions. Accordingly, the neural network reservoir 240 has the power of a recurrent neural network 402 to model non-stationary (time-varying) processes and phenomena, but with simple readout layers 406 and training algorithms that are both accurate and efficient. The neural network reservoir 240 is configured to implement an adaptable state-space filter or time-varying filters 408.

In accordance with an embodiment, the neural network reservoir 240 has the following state-space representation as illustrated in FIG. 4:

$$\underline{\dot{x}}(t) = \underline{A}\underline{x}(t) + \underline{B}u(t)$$

$$y(t) = \underline{C}(t)^T \underline{x}(t) + D(t)u(t)$$

where $\underline{A}$ is the reservoir connectivity matrix that determines the filter pole locations, $\underline{B}$ is a vector of weights 410 of the input layer 412 that map the input to the neural network reservoir 240, $\underline{C}(t)$ is a set of tunable output layer weights 414 that map the reservoir states 416 $a$-416 $n$ to the outputs

418 or de-noised reservoir state signals and determine the zero filter locations of the filters 408, and D(t) is the direct mapping from input to output. Similarly, the output layer weights ($\underline{C}$) determine the filter zero locations of the filters 408.

The different components in the neural network reservoir 240 may have a direct correspondence with the different parameters of the state-space representation 404. As the tunable output layer weights 414 are adaptable, the neural network reservoir 240 implements an adaptable state-space filter 420 where the poles are fixed, but the zeros are adapted in real-time based on the input signal. The neural network reservoir 240 maps an input signal vector or input signal to the high-dimensional state-space representation 404 that models the underlying time-varying dynamics of the signal generation process. In some embodiments, the input signal may be linearly mapped to reservoir states of a dynamical reservoir. The reservoir states 416$a$-416$n$ can be mapped to the outputs 418, including de-noised inputs, signal classes, separated signals, and anomalies using the trainable linear readout layers 406. There is a direct correspondence between state-space representation components and parameters in the neural network reservoir 240. Other examples of a neural network reservoir that may be used for the neural network reservoir 240 of the first and second denoisers 232 and 234 are described in U.S. Pat. Nos. 10,128,820, 10,380, 062, 10,783,430, and 11,165,414, each of which are assigned to the same assignee or one of the same assignees as the present application and are incorporated herein by reference.

According to another aspect of the present disclosure, the first and second denoisers 232 and 234 of the denoiser system 230 may each provide denoised signals with zero phase error and zero delay. With Kalman filters and other signal processing techniques for noise reduction of a signal, an introduced phase error and time delay or filter lag will alter the forward and reverse portions of the signal such that it is not possible to combine the two to get a reconstructed composite signal. However, the first and second denoisers 232 and 234 of the denoiser system 230 may each be utilized to produce a predicted signal with zero phase error and zero delay for both the forward and reverse portions of a reconstructed composite signal. The end result is a composite signal that is free of adaptation time or filter delay, unlike any other signal processing or filtering technique.

In some embodiments, each of the first and second denoisers 232 and 234 may be configured to acquire a select length of a signal measurement that provides a predetermine number of observations, and sample a signal in frequency for a plurality of states to establish a matrix collection (A) of multiple poles of filters that propagate the states over time. The first and second denoisers 232 and 234 may each be further configured to determine an input distribution vector (B), and determine states relative to time x(t) to establish a matrix of current states x(t), a vector (X) of the states, and a collection (C) of X(t) for establishing a matrix of history of states (x). The denoisers may be configured to perform an element wise multiplication of C and X (where C is a mapping from the states to the output, and X the history of states), whereby the denoisers can minimize error between the signal measurement and a prediction of the signal. The denoisers accordingly may each produce a predicted signal that would contain zero phase error or delay when combining a denoised signal with a denoised time reversed signal to form an output signal that represents a complete denoised signal waveform. As such, the denoised signals include near-zero phase error and near-zero phase delay, so as to inhibit distortion of the signal at the boundary between the forward and reverse portions of the combined signal from introduced phase error and time delay in the signal.

Referring again to FIG. 2, the signal combiner 238 of the denoiser unit 204 may be operatively coupled or connected to the first denoiser 232 and the second denoiser 234. The signal combiner 238 receives the denoised signals generated or output from each of the first and second denoisers 232 and 234, combines the denoised signals into a combined signal, and outputs the combined signal at an output of the signal combiner 238. In some embodiments, the signal combiner 238 performs a summing operation that adds the denoised signals generated or output from the first and second denoisers 232 and 234 to form a combined signal. The signal combiner 238 may output the combined signal for further processing.

Figure 5:
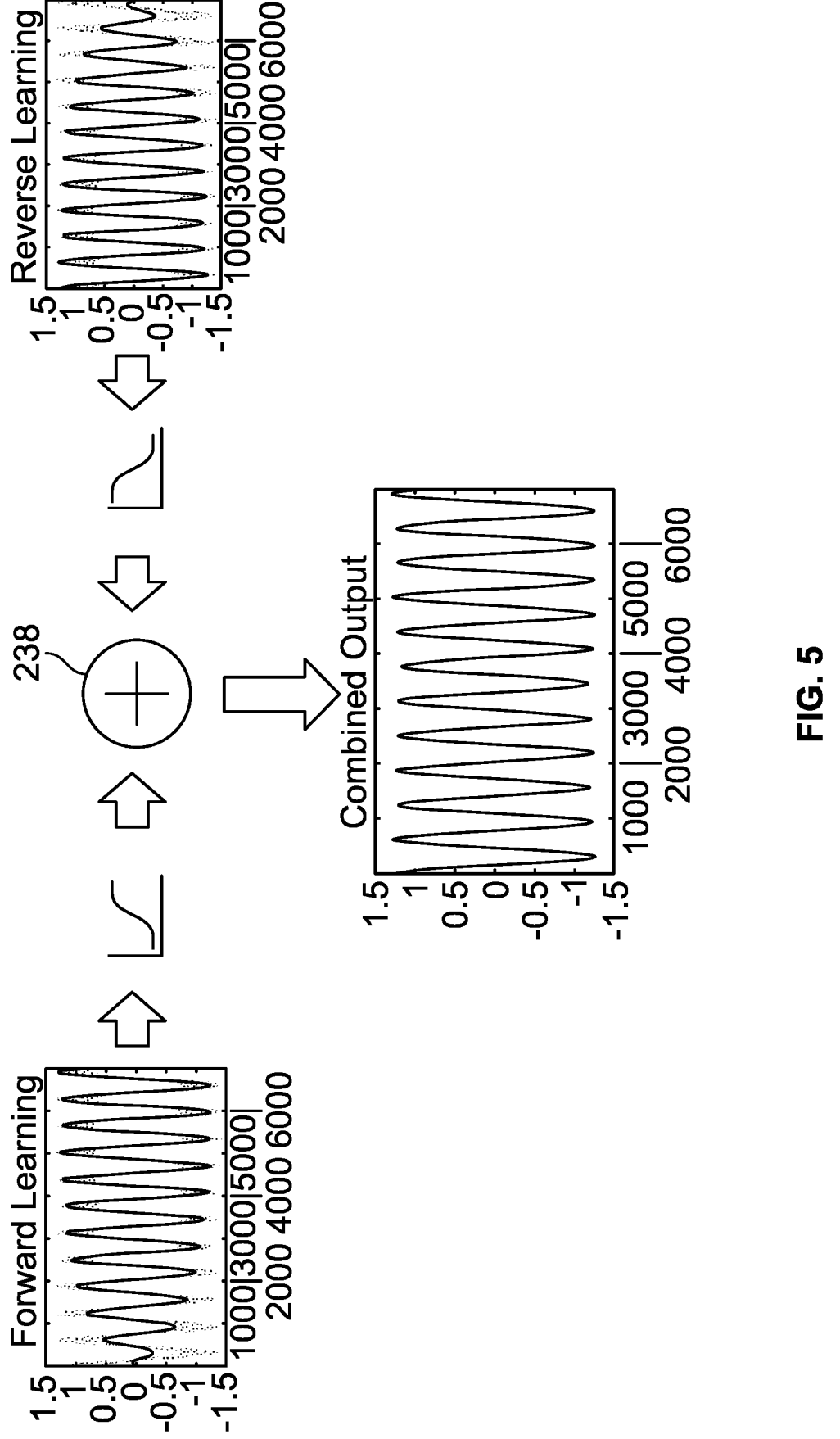
FIG. 5 illustrates an exemplary waveform generated by a signal combiner of a denoise, according to an example embodiment.

FIG. 5 shows an exemplary waveform (e.g., denoised signal) generated or output by the signal combiner 238 of the denoiser unit 204. As shown in FIG. 5, the signal combiner 238 may combine the forward learning period of the denoised signal received from the first denoiser 232 with the reverse learning period of the denoised time reversed signal received from the second denoiser 234 to generate a combined output. In some embodiments, the signal combiner 238 may combine the received or input signal by multiplying one of the received signal by the cumulative distribution function (CDF) centered on a join location and the other input by the inverse cumulative distribution function (1–CDF). The combined signal may be output by the signal combiner 238. The combined signal may correspond to the portion of the denoised signal generated during the transient response of the first denoiser. The denoised signal of the first denoiser may correspond to the steady state may be added to the end of the combined signal to form the full or complete denoised signal.

In some embodiments, the system 200 may use the denoised signal to determine a time difference between the arrival of the signals received by the receiver systems or the antennas of the receivers systems. The system 200 may also determine an angular resolution between objects in the environment based on the time difference. The system 200 may also use the denoised signal for estimating angle of arrival of the signals received by the receiver unit. Further, in some embodiments, the system 200 may be configured to use the denoised signals to estimate the angle of arrival (AOA) of the received signals and to generate an output including the estimated angle of arrival information, which may for example be communicated to a vehicle communication system (e.g., an aircraft's avionics unit) for determining a location of an emitting source relative to the vehicle (e.g., aircraft). Additionally, the denoised signal may be used for anomaly detection, blind source separation, signal classification, event/behavior prediction, and autonomous action generation. As such, the features of the system 100 may provide many benefits for applications such as communication, automotive anti-collision radars, and electronic warfare.

Figure 6:
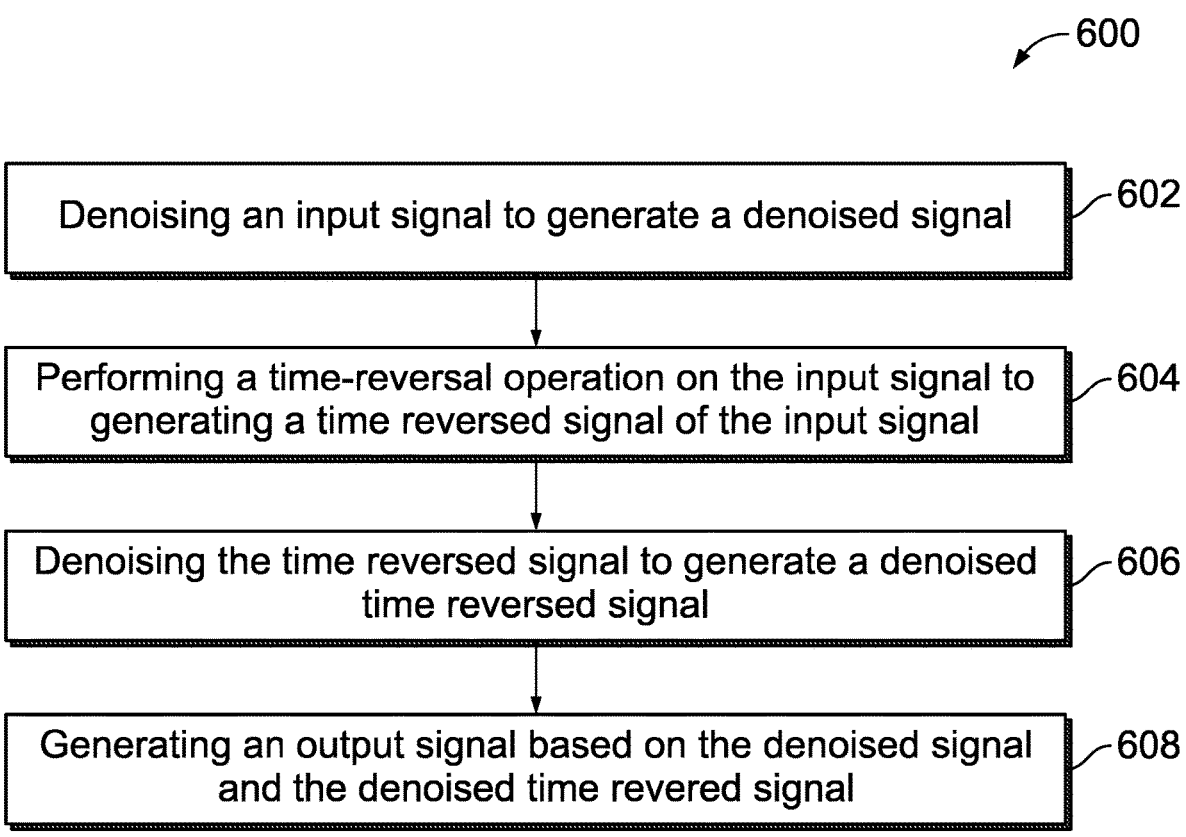
FIG. 6 illustrates a flow chart of a process for denoising a signal, according to an exemplary embodiment.

FIG. 6 illustrates a flowchart of an exemplary method 600 for denoising signals according to an exemplary embodiment. The method 600 may include one or more operations, functions, or actions, as depicted by one or more of blocks 602-608, each of which may be carried out by any of the apparatus, systems, devices, or method shown in prior figures, among other possible systems. For example, the method 600 may be embodied in and performed by the system 100 in FIG. 1 and/or the system 200 in FIG. 2. The method 600 may also be embodied in computer program instructions stored on a computer program product. Further, the method 600 may be performed in whole or in part by a computing device, such as a device similar to or the same as processing unit 106 described above.

Those skilled in the art will understand that the method 600 illustrates functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

The method 600 may process signals (e.g., wireless signals) received from one or more sources in an environment. The signals may represent electromagnetic energy or waves of any type. For example, the signals may include radar and/or radio frequency (RF) signals. The method 600 may be denoise the signals to achieve high signal-to-noise ratios (SNR).

At block 602, the method involves denoising an input signal to generate a denoised signal. For example, an output signal from a receiver system may be input into a denoiser. The denoiser may denoise the output signal of the receiver system and generate a denoised signal as described above. The denoising of the output signal of the receiver system may be performed by the first denoiser 232 of the system 200 shown in FIG. 2.

At block 604, the method involves performing a time-reversal operation on the input signal to generating a time reversed signal of the input signal. For example, the output signal from a receiver system may be input into a signal reverser. The signal reverser may time reverse the output signal of the receive system to generate a time reversed signal. The time reversal of the output of the receive system may be performed by the signal reverser 236 of the system 200 shown in FIG. 2.

At block 606, the method involves denoising the time reversed signal to generate a denoised time reversed signal. For example, the time reversed signal generated and output by the signal reverser may be input into a denoiser. The denoiser may denoise the time reversed signal and generate a denoised time revered signal as described above. The denoising of the time reversed signal may be performed by the second denoiser 234 of the system 200 shown in FIG. 2.

At block 608, the method involves generating an output signal based on the denoised signal and the denoised time revered signal. For example, the output signals of the first and second denoiser may be input into a signal combiner. The signal combiner may combined the signals to form a combined signal. The combining of the denoised signal and the denoised time revered signal may be performed by the signal combiner 238 of the system 200 shown in FIG. 2. The combined signal may be further processed to obtain information about the output signal of the receiver system.

In summary, the present application relates to embodiments for processing signals, such as wireless communications, using a denoiser. The denoiser may be used with a receiver unit and other systems on vehicle or airborne platforms and any system that can perform real-time processing of signals over a bandwidth. The denoiser may receive signals from one or more receiver systems. The denoiser may be configured to denoise the received signals to achieve high signal-to-noise ratios (SNR). In one embodiment, the denoised signals may be used to estimate angle of arrival of the signals received by a receiving systems. The features of the embodiments may provide many benefits for applications such as communication, biomedical imaging, automotive anti-collision radars, and electronic warfare.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

What is claimed is:

1. An apparatus comprising:
a first denoiser configured to receive an input signal and to generate a denoised signal, wherein the denoised signal includes near-zero phase error and near-zero phase delay;
a signal reverser configured to receive the input signal and to generate a time reversed signal;
a second denoiser configured to receive the time reversed signal and to generate a denoised time reversed signal, wherein the denoised time reversed signal includes near-zero phase error and near-zero phase delay; and
a signal combiner configured to add the denoised signal and the denoised time reversed signal to generate an output signal.

2. The apparatus according to claim 1, further comprising a receiver configured to receive a mixture of signals, wherein the receiver is configured to digitize the mixture of signals to generate the input signal, and wherein the mixture of signals comprises a noise signal and one or more waveform signals from one or more sources.

3. The apparatus according to claim 2, further comprising an antenna configured to receive radio frequency (RF) signals or radar signals and to generate the mixture of signals.

4. The apparatus according to claim 2, wherein the receiver includes an analog-to-digital converter (ADC), and wherein the ADC is configured to digitize the mixture of signals to generate the input signal.

5. The apparatus according to claim 4, wherein the receiver further comprises an amplifier that amplifies the mixture of signals before the mixture of signals is received by the ADC, and wherein the amplifier amplifies the mixture of signals to a predetermined amplitude for sampling by the ADC.

6. The apparatus according to claim 1, wherein the input signal is a time-series of data points of a mixture of signals, wherein the denoised signal is an estimate of a signal of interest, and wherein the denoised time reversed signal is an estimate of a time reversal of the signal of interest.

7. The apparatus according to claim 1, wherein the first denoiser includes a first multi-pole filter, wherein the first multi-pole filter is configured to filter and/or shape the input signal, and wherein the second denoiser includes a second multi-pole filter, wherein the second multi-pole filter is configured to filter and/or shape the denoised reversed time signal.

8. The apparatus according to claim 1, wherein the first denoiser is configured to process the input signal using a first neural network to generate the denoised signal, and wherein the second denoiser is configured to process the time reversed signal using a second neural network to generate the denoised time reversed signal.

9. The apparatus according to claim 1, wherein the first denoiser comprises a plurality of neural network reservoirs that interact with each other to enhance detection of the input signal, and wherein the second denoiser comprises a plurality of neural network reservoirs that interact with each other to enhance detection of the input signal.

10. The apparatus according to claim 1, wherein the first denoiser is configured to:

linearly map the input signal to reservoir states of a dynamical reservoir;

generate a high-dimensional state-space representation of the input signal by combining the input signal with the reservoir states;

denoise the reservoir states by removing noise from each reservoir state signal; and generate the denoised signal by combining the denoised reservoir states.

11. The apparatus according to claim 10, wherein the second denoiser is configured to:

linearly map the time reversed signal to reservoir states of a dynamical reservoir;

generate a high-dimensional state-space representation of the time reversed signal by combining the time reversed signal with the reservoir states;

denoise the reservoir states by removing noise from each reservoir state signal; and generate the denoised time reversed signal by combining the denoised reservoir states.

12. The apparatus according to claim 1, further comprising a transmitter for transmitting a radio frequency (RF) signal or a radar signal.

13. A method comprising:

denoising, at one or more denoisers, an input signal to generate a denoised signal, wherein the denoised signal includes near-zero phase error and near-zero phase delay;

performing a time-reversal operation on the input signal to generate a time reversed signal of the input signal;

denoising, at the one or more denoisers, the time reversed signal to generate a denoised time reversed signal, wherein the denoised time reversed signal includes near-zero phase error and near-zero phase delay; and generating an output signal based on adding the denoised signal and the denoised time revered signal.

14. The method according to claim 13, wherein the input signal is a time-series of data points of a mixture of signals, wherein the denoised signal is an estimate of a signal of interest, and wherein the denoised time reversed signal is an estimate of a time reversal of the signal of interest.

15. The method according to claim 13, further comprising generating the input signal based on a mixture of signals, and wherein the mixture of signals comprises a noise signal and one or more waveform signals from one or more sources.

16. The method according to claim 13, wherein the one or more denoisers includes a first denoiser and a second denoiser, wherein the first denoiser includes a first multi-pole filter, wherein the first multi-pole filter is configured to filter and/or shape the input signal, and wherein the second denoiser includes a second multi-pole filter, wherein the second multi-pole filter is configured to filter and/or shape the denoised reversed time signal.

17. The method according to claim 13, wherein denoising the input signal further comprises processing the input signal using a first neural network, and wherein denoising the time reversed signal further includes processing the time reversed signal using a second neural network.

18. The method according to claim 13, wherein the one or more denoisers comprise a plurality of neural network reservoirs that interact with each other to enhance detection of the input signal.

19. The method according to claim 13, wherein denoising the input signal comprises:

linearly mapping the input signal to reservoir states of a dynamical reservoir;

generating a high-dimensional state-space representation of the input signal by combining the input signal with the reservoir states;

denoising the reservoir states by removing noise from each reservoir state signal; and generating the denoised signal by combining the denoised reservoir states.

20. A non-transitory computer-readable medium having stored thereon instruction code, wherein the instruction code is executable by one or more processors to perform operations comprising:

denoising an input signal to generate a denoised signal, wherein the denoised signal includes near-zero phase error and near-zero phase delay;

generating a time reversed signal of the input signal;

denoising the time reversed signal to generate a denoised time reversed signal, wherein the denoised time reversed signal includes near-zero phase error and near-zero phase delay; and generating an output signal by adding the denoised signal and the denoised time revered signal.

\* \* \* \* \*